United States Patent [19]

Tracy

[11] 4,283,082

[45] Aug. 11, 1981

[54] TOOL FOR RETAINING AND RELEASING RINGED ELEMENTS

[76] Inventor: Wayne R. Tracy, 132 Royal St., Chicopee, Mass. 01020

[21] Appl. No.: 144,430

[22] Filed: Apr. 28, 1980

[51] Int. Cl.³ .............................................. B65G 7/12
[52] U.S. Cl. ................................. 294/15; 273/148 R; 221/199
[58] Field of Search ................ 294/15, 94, 87.25, 100, 294/87 R; 221/199, 312 R; 273/148 R; 81/125

[56] References Cited

U.S. PATENT DOCUMENTS

| 2,320,967 | 6/1943 | Dunkelberger | 294/100 |
| 3,228,555 | 1/1966 | Pinto | 294/15 |

Primary Examiner—James B. Marbert
Attorney, Agent, or Firm—Marvin S. Siskind

[57] ABSTRACT

Disclosed herein is a tool for retaining and releasing ringed members. Although primarily intended for use in dispensing ringed members onto Bingo-type game cards, the tool may also be used to release any type of ringed member such as nuts or washers onto screws or bolts. Regardless of its intended use, the tool comprises an axially elongated, hollow tube having oppositely disposed ends, the outer diameter of the tube being less than the inner diameter of a ringed member adapted to be retained thereon and released therefrom. A radially expandable member is secured to one end of the hollow tube and is adapted to reciprocate between a radially retracted position in which individual ringed members may be selectively released from said tube and a radially expanded position in which ringed members are retained on said tube. A recapturing element is secured to the opposite distal end of said tube for collecting ringed members which have been deposited on an adjacent surface. When used in a Bingo environment, the tool is adapted to release ringed members onto a Bingo card, to collect ringed members from the surface of the Bingo card, and to store ringed members about the outer diameter of the shaft of the hollow tube.

4 Claims, 5 Drawing Figures

U.S. Patent  Aug. 11, 1981  4,283,082
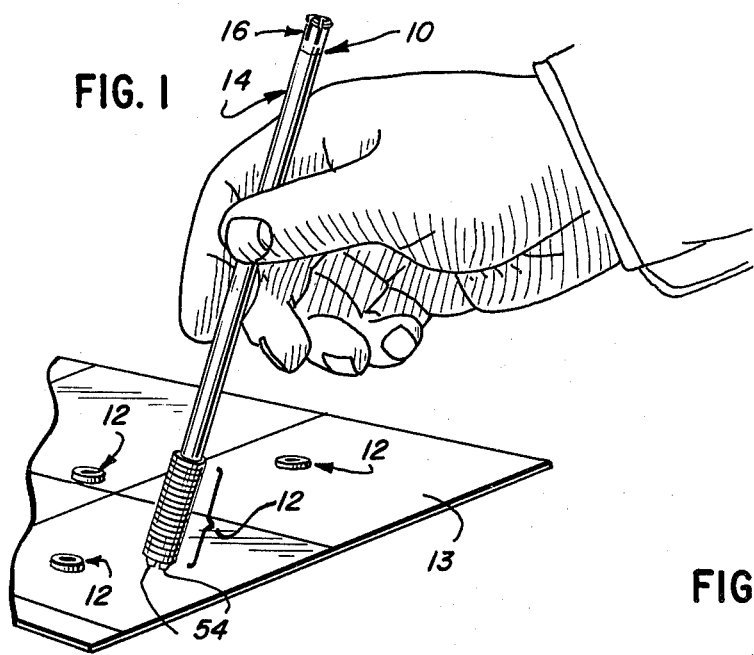
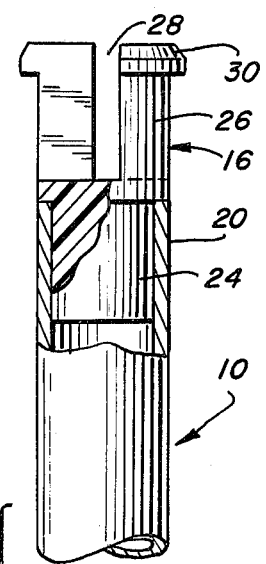
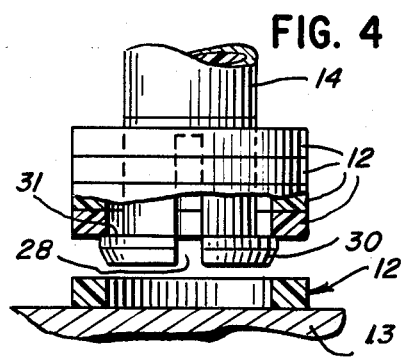
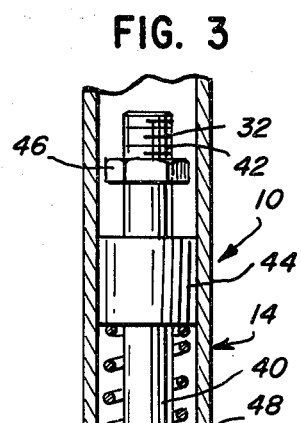
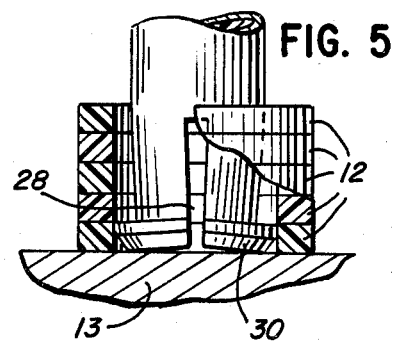
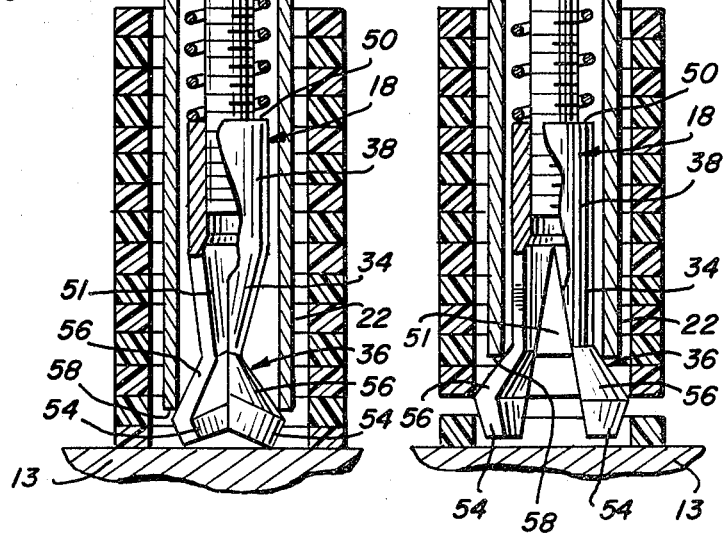

TOOL FOR RETAINING AND RELEASING RINGED ELEMENTS

FIELD OF THE INVENTION

The tool of the present invention relates generally to a device for retaining and releasing ringed members and more particularly relates to a tool for retaining ringed Bingo markers, releasing ringed Bingo markers onto a Bingo card and recollecting ringed markers from the surface of a Bingo card on which they have been deposited.

BACKGROUND OF THE INVENTION

In recent years, certain games of chance which have been exempted from the ambit of local gambling ordinances have gained immediate and widespread popularity. One such game, "Bingo" is now routinely employed by churches and other community groups for raising funds. In playing Bingo, at least one card, having a 5×5 matrix of squares and a number in each square imprinted thereon, is distributed to each player. Numbers are called by the moderator, and if a card has imprinted thereon the called number, that number is covered by a marker. The first person to cover all numbers in a given column, row, diagonal, etc., on a given card, wins. Since the game of Bingo appeals to all age groups, many players are of advanced ages for whom arthritic and other physical ailments make the act of depositing the marker on a called number difficult. And even for those players possessing a normal degree of finger mobility and dexterity, the placement of markers on the game cards, particularly when employing a plurality of cards for a single game, is a slow and laborious task.

It is therefore one object of the present invention to provide an easily manipulable tool for retaining, releasing, and recapturing ringed Bingo markers, which tool can be used by young and old players alike to dispense ringed markers onto game cards and collect ringed markers from said game cards.

Although the tool of the present invention is specially adapted for use in playing Bingo, other uses of the tool in environments featuring the release of ringed members is contemplated. For instance, washers and nuts could be stored on the instant tool without modifying the structure thereof. This use is valuable, where, because of the thin elongated structure of the tool, nuts and washers could be easily released therefrom onto bolts and screws located in otherwise inaccessible areas (an automobile engine is one example).

It is yet a further object of the present invention to provide a compact, automatic tool for retaining and releasing ringed members which allows the user to gain accessibility to tight working areas.

It is still another object of the present invention to provide a compact, automatic tool which normally retains ringed members thereon, which releases said ringed elements upon the application of pressure against the forward end thereof, and which includes a recapturing feature for picking up ringed elements.

These and other objects and advantages of the present invention will become apparent from the following description of the drawings and specification.

BRIEF SUMMARY OF THE INVENTION

A compact, automatic tool for retaining, selectively releasing and recapturing ringed members includes an axially elongated, hollow tube having oppositely disposed open ends. A ringed member retaining and releasing means also has opposed ends, one end of which is reciprocatingly secured to one of said open ends of said tube, while the other end of the retaining and releasing means is free. The retaining and releasing means includes a radially expandable means which responds to pressure applied against the free end thereof. The expandable means reciprocates axially between a first radially retracted position when pressure is applied against the free end of the retaining and releasing means, and a normally biased, radially expanded position when no pressure is applied against the free end. The outer diameter of the expandable means in the retracted position is equal to or less than the outer diameter of the hollow tube so that ringed members may pass thereover.

Secured to the other end of the hollow tube is one end of an end plug having opposed ends. The other end of said plug is slotted so as to compress radially when radial force is applied thereagainst. The slotted end of said plug includes a flange of a diameter greater than the outer diameter of said hollow tube and greater than the inner diameter of ringed members adapted for use with the tool. In this manner, the slotted flange of the plug may be radially compressed to capture the ring members thereover.

The retaining and releasing means is defined by an elongated central body portion, a reduced diameter pin portion and a hollow, threaded end portion. The body portion, the pin portion and the end portion are integrally formed. One end of the body portion includes a plurality of generally axial incisions therethrough to define a plurality of discrete sections which combine to form said radially expandable means. At least part of the length of the incisions is adapted to extend outwardly of said one end of said hollow tube when said retaining and and releasing means is operatively assembled in said tube.

A coil spring is positioned about the pin portion of the retaining and releasing means when said retaining and releasing means is operatively assembled within said tube, and the spring is adapted to normally bias the radially expandable means into the radially expanded position.

Each of the discrete sections of the radially expandable means includes a radially extending cam surface which, when the retaining and releasing means is operatively assembled in the tube, bears against the end of the hollow tube in which the retaining and releasing means is reciprocatingly secured. In this manner, selective reciprocation of the retaining and releasing means effects a camming action between each of said cam surfaces and said end of the hollow tube so as to expand and retract the radially expandable means.

The tool, just described, is specially adapted to release ringed markers onto a Bingo card, to collect ringed markers from the surface of the Bingo card, and to store ringed markers about the outer diameter of the hollow tube. However, other uses of the tool such as to deposit washers and nuts onto screws and bolts are also within the scope of the present invention.

BRIEF DESCRIPTION OF THE DRAWINGS

FIG. 1 is a perspective view of the ringed member retaining and releasing tool of the present invention, illustrating the use of said tool for releasing a ringed member onto a surface;

FIG. 2 is a partial cross-sectional view of the tool of the present invention taken along line 2—2 of FIG. 1 and showing the expandable means in the radially expanded position after releasing a ringed member onto a support surface;

FIG. 3 is a cross-sectional view of the retaining and releasing means end of the tool of the present invention, similar to the view of FIG. 2, illustrating the radially expandable means in the retracted position for releasing a ringed member from the periphery of the hollow tube;

FIG. 4 illustrates the slotted plug secured to the end of the hollow tube opposite the retaining and releasing end, the plug end of the tool in position to recapture a ringed member from a support surface; and FIG. 5 shows the flanged end of the slotted end plug of FIG. 4 as radially compressed so as to recapture a ringed member from a support surface.

DETAILED DESCRIPTION OF THE DRAWINGS

Referring now to the drawings and particularly to FIG. 1, the ringed member retaining and releasing tool of the present invention is shown generally as 10. The tool 10 is adapted for use in combination with a plurality of similarly dimensioned ringed members such as 12 which are normally retained or stored on said tool 10. In FIG. 1, ringed members 12 are disposed on a flat surface 13 for collection by the tool 10.

The tool comprises a hollow tube 14 on which the ringed members are stored, a slotted end plug 16 which is used to collect the ringed members 12, and a ringed member retaining and releasing member 18 which selectively retains and releases the ringed members 12.

The hollow tube 14 is a thin, axially elongated pipe having oppositely disposed open ends 20 and 22.

The end plug 16 also includes opposed ends 24 and 26. One end 24 of said slotted plug 16 is secured to one open end 20 of said hollow tube 14. The other end 26 of said slotted plug 16 includes at least one slot 28 for permitting said other end 26 to be radially compressed when radial force is applied to said slotted end 26. The slotted end 26 also includes a flange 30 of a diameter greater than the outer diameter of the hollow tube 14 and greater than the inner diameter of the ringed members 12. The slotted flange 30 of the end plug 16 is thereby adapted to be radially compressed when the slotted flange 30 of said tool 10 is forced into the interior of a ringed member 12 so as to capture said ringed members 12 thereover, see FIG. 5. FIG. 4 illustrates the normal, non-compressed condition of said plug 16 with the top shoulder 31 of the flange 30 serving as a stop for ringed members 12 stored thereabove.

The ringed member retaining and releasing means 18 has two opposed ends 32 and 34. One end 32 of the retaining and releasing means is reciprocatingly secured to the end 22 of the hollow tube 14 while the other end 34 of the retaining and releasing means 18 is free. The retaining and releasing means 18 includes a radially expandable means 36 which responds to axial pressure applied against the free end 34 thereof to release ring members 12. The expandable means 36 is adapted for selective, axial reciprocation between a first, radially retracted position when pressure is applied against said free end 34, see FIG. 3, and a normally biased, radially expanded position when no pressure is applied to said free end 34, see FIG. 2. The degree of expansion and retraction is not important as long as (1) the outer diameter of the expandable means 36, when in the retracted position of FIG. 3, is equal to or less than the outer diameter of the hollow tube 14, and (2) the outer diameter of the expandable means 36, when in the expanded position of FIG. 2, is greater than the inner diameter of the ring members 12 used therewith.

More specifically, the retaining and releasing means 18 includes an elongated central body portion 38, a reduced diameter pin portion 40, an externally threaded end portion 42, an annular guide and spring stop member 44, a nut or other fastening member 46, a coil spring 48, and a spring stop shoulder 50. The body portion 38, the pin portion 40, and the threaded end portion 42 are preferably integrally formed. In its assembled, operational condition, the pin portion 40 of the retaining and releasing member 18, with the coil spring 48 positioned about the pin portion 40 and between the stop shoulder 50 and the stop member 44, is received within the bore of the annular guide and spring stop member 44. The retaining and releasing means 18 is maintained in position by securing the nut 46 to the threaded end portion 42 thereof. The nut 46, having a greater flat-to-flat width than the bore of said guide and stop member 44, cannot pass through said bore and thereby positions the retaining and releasing means 18 to lie partially outside of the hollow tube 14.

One end of the body portion 38 includes a plurality of generally axial, V-shaped incisions such as 51 therethrough, the incisions 51 defining a plurality of discrete finger sections 54. The finger sections 54, taken in combination, form said radially expandable means 36, the operation of which will be explained hereinafter. Each of the discrete finger sections 54 of the radially expandable means 36 includes a radially extending cam surface 56 which, when the retaining and releasing means 18 is operatively assembled in the one end 22 of the hollow tube 14, bears against the end surface 58 of the hollow tube 14. By positioning the retaining and releasing means 18 so as to lie partially outside of the hollow tube 14, selective reciprocation of said retaining and releasing means 18 effects a camming action between each of the cam surfaces 58 of the hollow tube 14 which alternately expands and retracts the radially expandable means 36.

Referring now to FIG. 2, it is apparent that the discrete finger sections 54 of the radially expandable means 36 of the retaining and releasing means 18 are normally biased by coil spring 48 into a radially expanded position wherein the outer diameter of the expandable means 36 is greater than (1) the outer diameter of the hollow tube 14 and (2) the inner diameter of the ringed members 12. In the radially expanded position, the ringed members 12, disposed about the outer diameter of the tube 14, are unable to fall under the influence of gravity, past the expanded finger sections 54. As to the FIG. 3 position, the discrete finger sections 54 of the radially expandable means 36 of the retaining and releasing means 18 are radially retracted by axially pushing the free end 34, of said expandable means 36, against a support surface 13 so as to overcome the bias of and compress coil spring 48. When pressure is applied to the free end 34, the retaining and releasing means 18 is moved axially upward within the hollow tube 14, with the end surface 58 of the tube 14 bearing against the cam surfaces 56 of the finger sections 54, to radially retract said finger sections 56. When radially retracted, the ringed members 12, disposed about the outer diameter of the tube 14, fall under the influence of gravity, past said retracted finger sections 54.

By selecting a material with a high degree of resilience, from which to fabricate the retaining and releasing means 18, the finger sections 54 would more rapidly return to the normally biased expanded position when pressure is no longer applied to the free end 34 of the expandable means 36. The rapid return to the expanded position permits the release of only a single ringed member 12 for each application of pressure against said free end 34. If, however, it is desired to release more than one ringed member 12 for each application of pressure, either (1) a material having a lower degree of resilience can be selected, or (2) the force of the coil spring 48, which downwardly biases the retaining and releasing means 18, can be reduced. The spring force can also be reduced in one of two ways. Either (1) a weaker coil spring 48 can be employed, or (2) the externally threaded end of the pin portion 42 can be lowered within the hollow tube 14 to reduce the compression of the coil spring 48, and thereby, due to the decreased potential energy of the spring 48, produce a decreased downward bias on the expandable means 36. The decreased spring bias decreases the force of the cam surface 56 of the discrete finger sections 54 of the expandable means 36 against the end surface 58 of the hollow tube 14, thereby radially retracting said finger sections 54 to a lesser extent than achieved with a stronger spring or by having the pin portion 42 positioned higher within the hollow tube 14. The less force acting on the finger sections 54, the more ringed members 12 can be released from said hollow tube 14 because of the increased time it takes said finger sections 54 to spring back to the radially expanded position of FIG. 2.

Although specific dimensions of the ringed markers 12 and the tool 10 have not been enumerated, it is necessary to maintain certain relative tolerances therebetween. The inner diameter of the ringed markers 12 must be greater than the outer diameter of the hollow tube 14, but less than (1) the outer diameter of the expandable means 36 in the radially expanded position and (2) less than the outer diameter of the slotted flange 30 in the non-compressed position. Also, the outer diameter of the expandable means 36 in the radially retracted position must be less than the inner diameter of the ringed markers 12. And the outer diameter of the slotted end plug 16 below the flange 30 must be less than the inner diameter of the ringed markers 12.

The tool 10 of the present invention is primarily intended to facilitate the playing of the game of Bingo. To this end, the ringed members 12 are stored along the length of the hollow tube 14. When it is necessary to release a ringed member 12 onto the numbered surface of a Bingo card, the free end 34 of the retaining and releasing means 18 is pressed against the surface of the card to radially retract the expandable means 36 and release a ringed member 12 onto the surface of the card. Upon completion of a game, the ringed members 12 can be collected onto said tube 14 by forcing the flanged end 30 of the end plug 16 through the aperrure in said ringed members 12.

Uses other than playing Bingo, of the tool 10 of the instant invention, are within the scope of this disclosure. The tool 10 has obvious applicability to situations in which a ringed member or annulus is to be released in a particular position. For instance, the tool 10 could be used to position washers and nuts over upwardly extending bolts in an automobile engine. Due to its thin, elongated shape, the tool 10 is adapted to provide access to cramped, hard-to-reach spaces.

It should be apparent that the tool 10 described hereinabove need not be limited to the release, retention and recapture of circularly shaped members. Members of any given peripheral configuration, as well as many different internal bore configurations, can be released, retained and recaptured with the instant tool.

While one form of the invention has been described, it will be understood that the invention may be utilized in other forms and environments, so that the purpose of the appended claims is to cover all such forms of devices not disclosed but which embody the invention disclosed herein.

What is claimed is:

1. A tool for retaining and selectively releasing ringed members, said tool including ringed member retaining and releasing means at one end thereof and ringed member capturing means at the other end thereof; said tool comprising, in combination:

an axially elongated, hollow tube having oppositely disposed open ends;

the retaining and releasing means including an integrally formed, elongated central body portion, a reduced diameter pin portion and a threaded end portion; the threaded end portion of said retaining and releasing means being secured for reciprocation adjacent one of said open ends of said tube and the other end of the retaining and releasing means being free; said retaining and releasing means including radially expandable means formed by a plurality of axial incisions through the central body means to define a plurality of discrete sections, at least part of the axial length of said incisions extends outwardly of said one end of said hollow tube when said retaining and releasing means is operatively assembled therein, said expandable means adapted for selective, axial reciprocation between a first, radially retracted position when pressure is applied against said free end, and a normally biased, radially expanded position when no pressure is applied to said free end, the outer diameter of the expandable means in the retracted position being equal to or less than the outer diameter of the hollow tube;

whereby the tool is adapted to slidably retain the ringed members about the outer diameter of the tube when the retaining and releasing means is in the normally biased, radially expanded position, and said tool is adapted to release ringed members from about the outer diameter of the tube when the retaining and releasing means is in the radially retracted position due to the application of pressure against the free end thereof; and an end plug having opposed ends, one end of said plug being secured to the end of said tube opposite the end securing said retaining and releasing means; the other end of said plug being slotted so as to compress radially when radial force is applied to the slotted end of said plug, said slotted end of said plug including a flange of a diameter greater than the outer diameter of said tube and greater than the inner diameter of ringed members adapted for use with the tool; whereby the slotted flange of the plug may be radially compressed to capture ringed members thereover.

2. A tool as in claim 1, wherein the tool is adapted to release a single ringed member at a time.

3. A tool as in claim 1, wherein a coil spring is positioned about said pin portion of said retaining and releasing means when said retaining and releasing means is operatively assembled within said tube, said spring adapted to normally bias said radially expandable means in the radially expanded position.

4. A tool as in claim 2 wherein each of the discrete sections of said radially expandable means includes a radially extending cam surface which, when said retaining and releasing means is operatively assembled in said tube, bears against the end surface of the hollow tube to which said retaining and releasing means is secured for reciprocation whereby reciprocation of said retaining and releasing means effects a camming action between each of said cam surfaces and said end surface of the hollow tube to expand and retract said radially expandable means.

* * * * *